(12) United States Patent
Gula et al.

(10) Patent No.: US 8,707,440 B2
(45) Date of Patent: Apr. 22, 2014

(54) SYSTEM AND METHOD FOR PASSIVELY IDENTIFYING ENCRYPTED AND INTERACTIVE NETWORK SESSIONS

(75) Inventors: Ron Gula, Marriottsville, MD (US);
Renaud Deraison, New York, NY (US);
Matthew T. Hayton, Rockville, MD (US)

(73) Assignee: Tenable Network Security, Inc., Columbia, MD (US)

( * ) Notice: Subject to any disclaimer, the term of this patent is extended or adjusted under 35 U.S.C. 154(b) by 681 days.

(21) Appl. No.: 12/729,036

(22) Filed: Mar. 22, 2010

(65) Prior Publication Data

US 2011/0231935 A1    Sep. 22, 2011

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| G06F 21/00 | (2013.01) | |
| G06F 21/56 | (2013.01) | |

(52) U.S. Cl.
CPC ............... *G06F 21/00* (2013.01); *G06F 21/56* (2013.01); *G06F 21/561* (2013.01); *G06F 21/562* (2013.01); *G06F 21/566* (2013.01)
USPC ................. 726/25; 726/23; 726/24; 713/151; 713/152; 713/153; 713/154; 713/188

(58) Field of Classification Search
CPC ......... G06F 21/00; G06F 21/50; G06F 21/56; G06F 21/561; G06F 21/562; G06F 21/566
USPC ....................... 726/22–25; 713/151–154, 188
See application file for complete search history.

(56) References Cited

U.S. PATENT DOCUMENTS

| 4,525,599 | A | 6/1985 | Curran et al. ............... 178/22.08 |
| 5,541,997 | A | 7/1996 | Pappas et al. .................... 380/49 |
| 5,572,729 | A | 11/1996 | Giordano et al. ............. 395/616 |
| 5,715,391 | A | 2/1998 | Jackson et al. ........... 395/200.01 |
| 5,721,819 | A | 2/1998 | Galles et al. ............. 395/200.15 |

(Continued)

OTHER PUBLICATIONS

Wack, John, et al., NIST Special Publication 800-42, "Guideline on Network Security Testing", Computer Security Division, National Institute of Standards and Technology, Oct. 2003, pp. 1-92.

(Continued)

*Primary Examiner* — Brandon Hoffman
*Assistant Examiner* — Jayesh Jhaveri
(74) *Attorney, Agent, or Firm* — Pillsbury Winthrop Shaw Pittman LLP

(57) ABSTRACT

The system and method for passively identifying encrypted and interactive network sessions described herein may distribute a passive vulnerability scanner in a network, wherein the passive vulnerability scanner may observe traffic travelling across the network and reconstruct a network session from the observed traffic. The passive vulnerability scanner may then analyze the reconstructed network session to determine whether the session was encrypted or interactive (e.g., based on randomization, packet timing characteristics, or other qualities measured for the session). Thus, the passive vulnerability scanner may monitor the network in real-time to detect any devices in the network that run encrypted or interactive services or otherwise participate in encrypted or interactive sessions, wherein detecting encrypted and interactive sessions in the network may be used to manage changes and potential vulnerabilities in the network.

18 Claims, 7 Drawing Sheets

(56) References Cited

U.S. PATENT DOCUMENTS

| | | | | |
|---|---|---|---|---|
| 5,838,919 | A | 11/1998 | Schwaller et al. | 395/200.54 |
| 5,844,817 | A | 12/1998 | Lobley et al. | 364/578 |
| 6,154,775 | A | 11/2000 | Coss et al. | 709/225 |
| 6,266,774 | B1 | 7/2001 | Sampath et al. | 713/201 |
| 6,269,447 | B1 | 7/2001 | Maloney et al. | 713/201 |
| 6,324,656 | B1 | 11/2001 | Gleichauf et al. | 714/37 |
| 6,393,568 | B1 | 5/2002 | Ranger et al. | 713/188 |
| 6,415,321 | B1 | 7/2002 | Gleichauf et al. | 709/224 |
| 6,487,666 | B1 | 11/2002 | Shanklin et al. | 713/201 |
| 6,499,107 | B1 | 12/2002 | Gleichauf et al. | 713/201 |
| 6,510,509 | B1 | 1/2003 | Chopra et al. | 712/13 |
| 6,606,663 | B1 | 8/2003 | Liao et al. | 709/229 |
| 6,704,874 | B1 | 3/2004 | Porras et al. | 713/201 |
| 6,711,127 | B1 | 3/2004 | Gorman et al. | 370/230 |
| 6,789,202 | B1 | 9/2004 | Ko et al. | 713/201 |
| 6,847,982 | B2 | 1/2005 | Parker et al. | 707/200 |
| 6,873,617 | B1 | 3/2005 | Karras | 370/389 |
| 6,882,728 | B1 | 4/2005 | Takahashi et al. | 380/201 |
| 6,886,020 | B1 | 4/2005 | Zahavi et al. | 707/204 |
| 6,952,779 | B1 | 10/2005 | Cohen et al. | 713/200 |
| 6,957,348 | B1 | 10/2005 | Flowers et al. | 713/201 |
| 6,968,377 | B1 | 11/2005 | Gleichauf et al. | 709/224 |
| 7,017,186 | B2 | 3/2006 | Day | 726/23 |
| 7,073,198 | B1 | 7/2006 | Flowers et al. | 726/25 |
| 7,093,287 | B1 | 8/2006 | Gusler et al. | 726/13 |
| 7,107,619 | B2 * | 9/2006 | Silverman | 726/27 |
| 7,120,148 | B1 | 10/2006 | Batz et al. | 370/392 |
| 7,134,141 | B2 | 11/2006 | Crosbie et al. | 726/23 |
| 7,139,819 | B1 | 11/2006 | Luo et al. | 709/223 |
| 7,152,105 | B2 | 12/2006 | McClure et al. | 709/224 |
| 7,162,742 | B1 | 1/2007 | Flowers et al. | 726/25 |
| 7,181,769 | B1 | 2/2007 | Keanini et al. | 726/23 |
| 7,237,264 | B1 | 6/2007 | Graham et al. | 726/23 |
| 7,243,366 | B2 | 7/2007 | Medvinsky et al. | 726/2 |
| 7,272,646 | B2 | 9/2007 | Cooper et al. | 709/223 |
| 7,290,145 | B2 | 10/2007 | Falkenthros | 713/163 |
| 7,310,687 | B2 | 12/2007 | Psounis et al. | 709/247 |
| 7,324,551 | B1 | 1/2008 | Stammers | 370/468 |
| 7,475,426 | B2 * | 1/2009 | Copeland, III | 726/23 |
| 7,509,681 | B2 | 3/2009 | Flowers et al. | 726/25 |
| 7,587,761 | B2 * | 9/2009 | Duffield et al. | 726/22 |
| 7,594,273 | B2 | 9/2009 | Keanini et al. | 726/25 |
| 7,653,647 | B2 | 1/2010 | Borthakur et al. | 707/102 |
| 7,661,134 | B2 | 2/2010 | Radatti | 726/22 |
| 7,735,100 | B1 | 6/2010 | Sallam | 719/330 |
| 7,739,377 | B2 | 6/2010 | Benedetti et al. | 709/224 |
| 7,761,918 | B2 | 7/2010 | Gula et al. | 726/23 |
| 7,904,479 | B2 | 3/2011 | Zuk | 707/791 |
| 7,908,254 | B2 | 3/2011 | Suermondt et al. | 707/698 |
| 7,926,113 | B1 | 4/2011 | Gula et al. | 726/25 |
| 7,936,682 | B2 * | 5/2011 | Singh et al. | 370/241 |
| 7,966,358 | B2 | 6/2011 | Deolalikar et al. | 708/250 |
| 8,069,484 | B2 * | 11/2011 | McMillan et al. | 726/23 |
| 8,135,815 | B2 | 3/2012 | Mayer | 709/223 |
| 8,291,498 | B1 * | 10/2012 | Liang et al. | 726/24 |
| 8,302,198 | B2 | 10/2012 | Deraison | 726/25 |
| 8,484,372 | B1 * | 7/2013 | Callon | 709/238 |
| 8,549,650 | B2 | 10/2013 | Hanson | 726/25 |
| 2001/0034847 | A1 | 10/2001 | Gaul, Jr. | 713/201 |
| 2002/0019945 | A1 | 2/2002 | Houston et al. | 713/201 |
| 2002/0093527 | A1 | 7/2002 | Sherlock et al. | 345/736 |
| 2002/0100023 | A1 | 7/2002 | Ueki et al. | 717/127 |
| 2002/0107841 | A1 | 8/2002 | Hellerstein et al. | 707/3 |
| 2002/0166063 | A1 | 11/2002 | Lachman, III et al. | 713/200 |
| 2003/0051026 | A1 | 3/2003 | Carter et al. | 709/224 |
| 2003/0056116 | A1 | 3/2003 | Bunker, V et al. | 713/201 |
| 2003/0135517 | A1 | 7/2003 | Kauffman | 707/103 R |
| 2003/0145225 | A1 | 7/2003 | Bruton, III et al. | 713/201 |
| 2003/0196123 | A1 | 10/2003 | Rowland et al. | 713/201 |
| 2004/0003266 | A1 | 1/2004 | Moshir et al. | 713/191 |
| 2004/0015719 | A1 | 1/2004 | Lee et al. | 713/201 |
| 2004/0034795 | A1 | 2/2004 | Anderson et al. | 713/201 |
| 2004/0042470 | A1 | 3/2004 | Cooper et al. | 370/401 |
| 2004/0193918 | A1 | 9/2004 | Green et al. | 713/201 |
| 2005/0068928 | A1 | 3/2005 | Smith et al. | 370/338 |
| 2005/0108578 | A1 | 5/2005 | Tajalli et al. | 713/201 |
| 2005/0128988 | A1 | 6/2005 | Simpson et al. | 370/338 |
| 2005/0188419 | A1 | 8/2005 | Dadhia et al. | 726/1 |
| 2005/0203886 | A1 | 9/2005 | Wong | 707/3 |
| 2005/0203921 | A1 | 9/2005 | Newman et al. | 707/100 |
| 2005/0229255 | A1 | 10/2005 | Gula et al. | 726/23 |
| 2006/0010245 | A1 | 1/2006 | Carnahan | 709/231 |
| 2006/0018466 | A1 | 1/2006 | Adelstein et al. | 380/46 |
| 2006/0117091 | A1 | 6/2006 | Justin | 709/217 |
| 2006/0184682 | A1 | 8/2006 | Suchowski et al. | 709/229 |
| 2006/0191008 | A1 * | 8/2006 | Fernando et al. | 726/23 |
| 2006/0282894 | A1 * | 12/2006 | Duffield et al. | 726/23 |
| 2007/0028304 | A1 | 2/2007 | Brennan | 726/24 |
| 2007/0169190 | A1 * | 7/2007 | Kolton et al. | 726/22 |
| 2007/0256129 | A1 * | 11/2007 | Jung et al. | 726/24 |
| 2007/0271598 | A1 | 11/2007 | Chen et al. | 726/4 |
| 2007/0271613 | A1 * | 11/2007 | Joyce | 726/23 |
| 2007/0277238 | A1 | 11/2007 | Margalit et al. | 726/22 |
| 2008/0022400 | A1 | 1/2008 | Cohen et al. | 726/22 |
| 2008/0047009 | A1 | 2/2008 | Overcash et al. | 726/23 |
| 2008/0072285 | A1 | 3/2008 | Sankaran et al. | 726/2 |
| 2008/0307524 | A1 * | 12/2008 | Singh et al. | 726/22 |
| 2009/0013141 | A1 | 1/2009 | Kinoshita | 711/163 |
| 2009/0049016 | A1 | 2/2009 | Sakamoto | 707/3 |
| 2009/0138945 | A1 * | 5/2009 | Savchuk | 726/4 |
| 2009/0177782 | A1 | 7/2009 | Blatherwick et al. | 709/228 |
| 2010/0030780 | A1 | 2/2010 | Eshghi et al. | 707/6 |
| 2010/0043066 | A1 * | 2/2010 | Miliefsky | 726/9 |
| 2010/0114842 | A1 | 5/2010 | Forman et al. | 707/692 |
| 2010/0281539 | A1 * | 11/2010 | Burns et al. | 726/23 |
| 2011/0099631 | A1 * | 4/2011 | Willebeek-LeMair et al. | 726/23 |
| 2011/0185055 | A1 | 7/2011 | Nappier et al. | 709/224 |
| 2011/0185431 | A1 | 7/2011 | Deraison | 726/25 |
| 2011/0277034 | A1 | 11/2011 | Hanson | 726/25 |
| 2011/0314245 | A1 | 12/2011 | Hanes et al. | 711/164 |
| 2013/0227714 | A1 | 8/2013 | Gula et al. | 726/32 |
| 2013/0247148 | A1 | 9/2013 | Nappier et al. | 726/3 |

OTHER PUBLICATIONS

Deraison, Renaud, et al., "Passive Vulnerability Scanning Introduction to NeVo", Revision 9, Tenable Network Security, Aug. 2003, pp. 1-13.

Deraison, Renaud, et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin, et al., "Detecting Backdoors", *Proceedings of the 9th USENIX Security Symposium*, Denver, Colorado, Aug. 2000, 11 pages.

"Basic Cryptanalysis", Department of the Army, Field Manual No. 34-40-2, Sep. 13, 1990, 363 pages.

Kim, Gene H., et al., "The Design and Implementation of Tripwire: A File System Integrity Checker", *Proceedings of the 2nd ACM Conference on Computer and Communications Security*, 1994, (Purdue Technical Report CSD-TR-93-071), 18 pages.

Oline, Adam, et al., "Exploring Three-Dimensional Visualization for Intrusion Detection", *Workshop on Visualization for Computer Security*, IEEE, Oct. 26, 2005, 9 pages.

"Present Your Data in a Column Chart", *Microsoft*, 2007, 6 pages.

Kim et al., "Real-Time Visualization of Network Attacks on High-Speed Links", *IEEE*, 2004, 10 pages.

Huang et al., "Research of Security Metric Architecture for Next Generation Network", *IEEE*, 2009, 6 pages.

* cited by examiner

SYSTEM AND METHOD FOR PASSIVELY IDENTIFYING ENCRYPTED AND INTERACTIVE NETWORK SESSIONS

CROSS-REFERENCE TO RELATED APPLICATIONS

This application is related to co-pending U.S. patent application Ser. No. 10/863,238, entitled "System and Method for Managing Network Vulnerability Analysis Systems," filed Jun. 9, 2004, co-pending U.S. patent application Ser. No. 11/016,761, entitled "System and Method for Scanning a Network," filed Dec. 21, 2004, U.S. patent application Ser. No. 11/313,710, entitled "System and Method for Managing Events," filed Dec. 22, 2005, now abandoned, co-pending U.S. patent application Ser. No. 12/693,803, entitled "System and Method for Correlating Network Identities and Addresses," filed Jan. 26, 2010, and co-pending U.S. patent application Ser. No. 12/695,659, entitled "System and Method for Enabling Remote Registry Service Security Audits," filed Jan. 28, 2010, the contents of which are hereby incorporated by reference in their entirety.

FIELD OF THE INVENTION

The invention relates to a system and method for passively identifying encrypted and interactive network sessions, and in particular, to observing traffic travelling in a network with a passive vulnerability scanner that can identify encrypted and interactive sessions in the network, detect changes in the network from the encrypted and interactive sessions identified in the network, and audit potential security vulnerabilities in the network from the encrypted and interactive sessions identified in the network.

BACKGROUND OF THE INVENTION

In many network environments, illegal or unauthorized users may exploit vulnerabilities in the network to gain access, deny access, or otherwise attack systems in the network. As such, to detect and remediate such network vulnerabilities, existing network security systems typically conduct vulnerability analysis in the network through manual inspection or network scans. For example, conventional network scanners (or "active vulnerability scanners") typically send packets or other messages to various devices in the network and then audit the network with information contained in any response packets or messages received from the devices in the network. Accordingly, physical limitations associated with the network typically limit the effectiveness for active vulnerability scanners because only devices that can communicate with the active vulnerability scanners can be audited, while actively scanning networks distributed over large areas or having large numbers of devices may take long amounts of time. For example, in a network that includes multiple routers, hosts, and other network devices, an active vulnerability scanner would typically have to send packets that traverse several routers to scan the hosts and other network devices, some of which may be inactive and therefore inaccessible to the active vulnerability scanner. Further, in scenarios where one or more of the routers have firewalls that screen or otherwise filter incoming and outgoing traffic, the active vulnerability scanner may generate incomplete results because the firewalls may prevent the active vulnerability scanner from auditing hosts or other devices behind the firewalls.

Furthermore, active vulnerability scanners typically create audit results that become stale over time because the audit results describe a static state for the network at a particular point in time. Thus, an active vulnerability scanner would likely fail to detect that hosts have been added or removed from the network following a particular active scan, whereby the audit results that active vulnerability scanners create tend to steadily decrease in value over time as changes to the network occur. Furthermore, active vulnerability scanners can have the tendency to cause network disruptions during an audit. For example, probing network hosts or other devices during an audit performed by an active vulnerability scanner may result in communication bottlenecks, processing overhead, and instability, among other potential problems in the network. For example, FIG. 1 illustrates a schematic diagram of an exemplary prior art network security system 100 that includes multiple routers 130, various network hosts or other devices 120, an active vulnerability scanner 110, and an interface to one or more other networks 140 (e.g., the Internet).

In the prior art system 100, the active vulnerability scanner 110 may send packets or other messages to the hosts or devices 120 in the network through the routers 130 to identify one or more of the hosts or devices 120 actively running in the network and one or more of the hosts or devices 120 that may be inactive. However, in many scenarios, one or more of the hosts or devices 120 may be deployed behind firewalls that screen incoming and outgoing traffic, may have disabled access to services that provide important information describing the hosts or devices 120, or may otherwise prevent the active vulnerability scanner 110 from suitably auditing the hosts or devices 120. As such, prior art systems that rely entirely on an active vulnerability scanner (e.g., the system 100 shown in FIG. 1) typically prevent the active vulnerability scanner from obtaining comprehensive information that describes important settings, configurations, or other information associated with the network. In particular, malicious or unauthorized users often employ various techniques to obscure network sessions during an attempted breach, but active vulnerability scanners 110 often cannot detect real-time network activity that may provide indications that the attempted breach is occurring. For example, many backdoor and rootkit applications tend to use non-standard ports and custom protocols to obscure network sessions, whereby intruders may compromise the network while escaping detection. Thus, many active vulnerability scanners 110 can only audit the state of a network at a particular point in time, but suitably managing network security often requires further insight relating to real-time activity that occurs in the network.

Accordingly, although active vulnerability scanners 110 typically employed in existing network security systems 100 can obtain certain information describing the network, the existing systems 100 cannot perform comprehensive security audits to completely describe potential vulnerabilities in the network, build models or topologies for the network, or derive other information that may be relevant to managing the network. Therefore, a need exists for a network security system that can supplement the information obtained from active vulnerability scanners to comprehensively describe potential vulnerabilities in a network, build detailed models or topologies for the network, and derive other information that can be used to manage the network.

SUMMARY OF THE INVENTION

Accordingly to one aspect of the invention, the system and method for passively identifying encrypted and interactive network sessions described herein may distribute a passive vulnerability scanner in a network, wherein the passive vulnerability scanner may observe traffic travelling across the network and reconstruct network sessions from the observed traffic. The passive vulnerability scanner may then analyze the reconstructed network sessions to determine whether the sessions were encrypted or interactive (e.g., in response to determining that the sessions included sufficient randomization or other measured qualities). Thus, the passive vulnerability scanner may monitor the network in real-time to detect any devices in the network that run encrypted or interactive services or otherwise participate in encrypted or interactive sessions, wherein detecting encrypted and interactive network sessions may be used to manage changes and potential vulnerabilities in the network. For example, in one implementation, the passive vulnerability scanner may analyze the traffic observed in the network in real-time and detect whether various packets communication during the observed sessions have sizes, frequencies, randomness, or other qualities indicating that the sessions have interactive or encrypted characteristics. Thus, the passive vulnerability scanner may detect and manage one or more vulnerabilities in the network in response to identifying the sessions that have the interactive or encrypted characteristics (e.g., monitoring interactive sessions that typically include activity occurring through keyboard inputs, encrypted sessions that can obscure activity that installs backdoors, rootkit applications, compromised tools, etc.).

According to one aspect of the invention, the system and method described herein may distribute a passive vulnerability scanner to observe activity on a network. In particular, the activity observed by the passive vulnerability scanner may generally include a plurality of packets that travel across the network during one or more sessions on the network. In one implementation, the passive vulnerability scanner may then sniff the plurality of packets to determine whether the one or more sessions communicate interactive or encrypted data. Thus, in response to determining that the one or more sessions communicate interactive or encrypted data, the passive vulnerability scanner may reconstruct the one or more sessions to identify an originating host and a receiving host for the interactive or encrypted data. In addition, the passive vulnerability scanner may further identify one or more potential vulnerabilities associated with the reconstructed sessions and prepare a report describing the reconstructed sessions and the potential vulnerabilities.

According to one aspect of the invention, the system and method described herein may further reconstruct the one or more sessions to identify open ports and running services that communicate the interactive or encrypted data between the originating host and the receiving host. Furthermore, to determine whether the sessions communicate encrypted data, the passive vulnerability scanner may determine whether any of the plurality of packets have randomization measures that satisfy a predetermined threshold, or whether any of the packets have compressed file types or identify services that tend to communicates encrypted data. In one implementation, to determine whether the sessions communicate interactive data, the passive vulnerability scanner may determine whether any of the plurality of packets have sizes, frequencies, inter-packet arrival times, or other timing characteristics indicating that the one or more packets likely include data typed on a keyboard. For example, the passive vulnerability scanner may determine that the sessions communicate interactive data in response to any of the plurality of packets identifying a Telnet service, a chat service, a Secure Shell service, or another service that typically communicates data typed on a keyboard. Furthermore, the report prepared by the passive vulnerability scanner may further characterize the interactive or encrypted sessions based on locations for the originating and receiving hosts. For example, the passive vulnerability scanner may determine that the interactive or encrypted sessions include internal sessions in response to the originating host and the receiving host having locations within the network, outbound sessions in response to the originating host having a location within the network and the receiving host having a location remote from the network, and inbound sessions in response to the originating host having a location remote from the network and the receiving host having a location within the network.

Other objects and advantages of the invention will be apparent to those skilled in the art based on the following drawings and detailed description.

DETAILED DESCRIPTION

Figure 1:
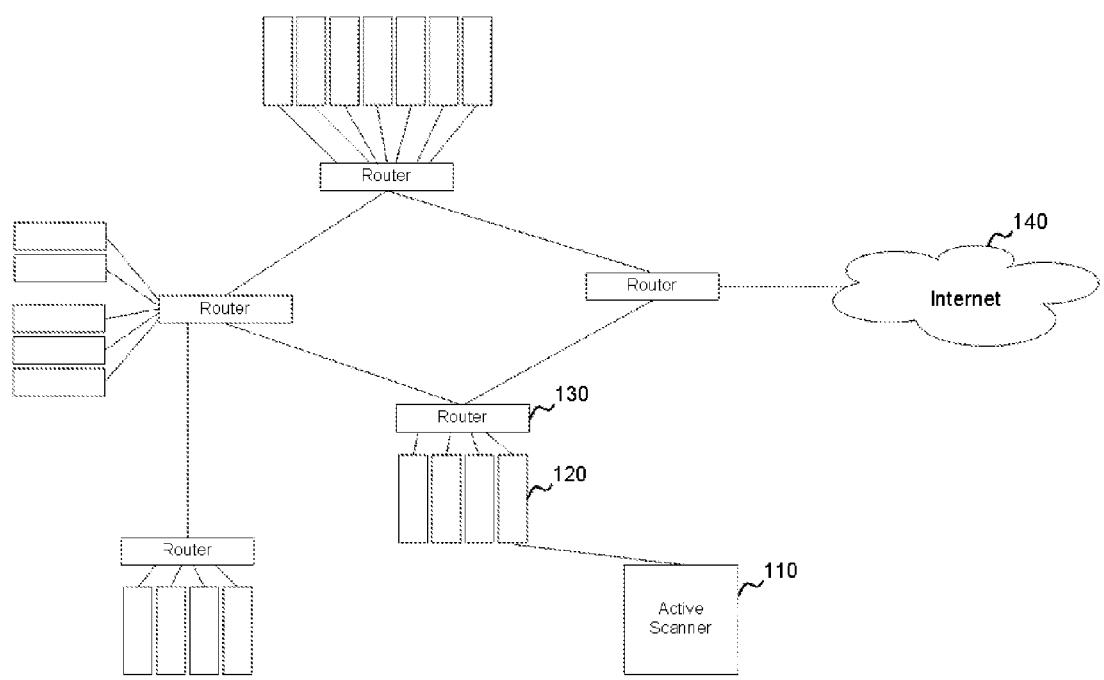
FIG. 1 illustrates a schematic diagram of an exemplary prior art system that does not passively identify encrypted and interactive network sessions.
Figure 2:
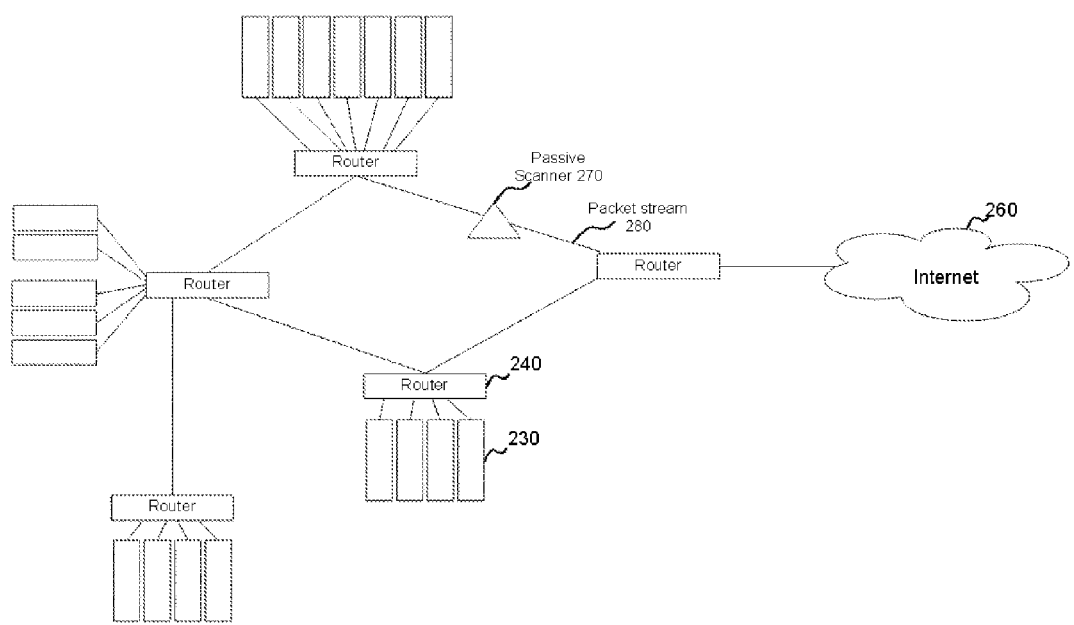
FIG. 2 illustrates a schematic diagram of an exemplary system for passively identifying encrypted and interactive network sessions, according to one aspect of the invention.

According to one aspect of the invention, FIG. 2 illustrates a schematic diagram of an exemplary system 200 for passively identifying encrypted and interactive network sessions. In particular, the system 200 shown in FIG. 2 may generally include one or more passive vulnerability scanners 270 that can observe traffic in a packet stream 280 travelling in a network to identify vulnerabilities in the network and detect activity that may target the identified vulnerabilities, and may further include one or more active vulnerability scanners that can communicate packets or other messages within the network to detect new or changed information describing various routers 240, hosts 230, servers 230, or other devices 230 in the network. For example, in one implementation, the active vulnerability scanners may include active vulnerability scanners 410 and 420 (e.g., illustrated in FIG. 4), which may scan certain hosts, servers, or other devices 230 in the network during a security audit. The information obtained from actively scanning the devices 230 may then be analyzed to identify potential vulnerabilities in the network. In one implementation, the passive vulnerability scanner 270 may observe packet stream 280 traversing the network to identify further potential vulnerabilities in the network, wherein the passive vulnerability scanner 270 may then further observe the packet stream 280 to detect any activity potentially targeting the vulnerabilities identified by the active vulnerability scanners and/or the passive vulnerability scanner 270.

In one implementation, the passive vulnerability scanner 270 may generally observe the packet stream 280 travelling across the network to reconstruct one or more sessions occurring in the network. The passive vulnerability scanner 270 may then analyze the reconstructed network sessions to identify various potential vulnerabilities in the network and/or activity targeting the potential vulnerabilities, including one or more of the reconstructed sessions having interactive or encrypted characteristics (e.g., the passive vulnerability scanner 270 may identify the sessions having the interactive or encrypted characteristics in response to determining that various packets in the packet stream 280 had certain sizes, frequencies, randomness, or other qualities that may indicate potential backdoors, covert channels, or other vulnerabilities in the network). Thus, the passive vulnerability scanner 270 may monitor the network in real-time to detect any potential vulnerabilities in the network in response to identifying interactive or encrypted sessions in the packet stream 280 (e.g., interactive sessions may typically include activity occurring through keyboard inputs, while encrypted sessions may cause communications to appear random, which can obscure activity that installs backdoors or rootkit applications). Thus, in one implementation, the passive vulnerability scanner 270 may identify changes in the network from the encrypted and interactive network sessions (e.g., a new e-commerce server may be identified in response to the passive vulnerability scanner 270 observing an encrypted and/or interactive session between a remote host and a certain port on the server typically used to process electronic transactions).

In one implementation, the passive vulnerability scanner 270 may observe as many sessions in the network as possible to provide optimal visibility into the network and the activity that occurs in the network. For example, in one implementation, the passive vulnerability scanner 270 may be deployed at a network hub, a spanned switch port, a network tap, a network choke point, a dial up node, a server farm, behind a firewall, or any other suitable location that enables the passive vulnerability scanner 270 to observe incoming and outgoing traffic in the network. Alternatively (or additionally), the passive vulnerability scanner 270 may be deployed directly in or adjacent to an intrusion detection system (IDS), as shown and discussed below in connection with FIG. 5. Furthermore, in one implementation, the IDS may include an open source network intrusion prevention and detection system (e.g., Snort), a packet analyzer, or any other suitable system that can detect and prevent intrusions in the network, and the passive vulnerability scanner 270 may be deployed on a server running an open source operating system (e.g., a Red Hat Linux operating system, a FreeBSD operating system, etc.), or any other suitable operating system.

In one implementation, as noted above, the active vulnerability scanner may generally communicate various packets or other messages within the network to illicit responses from hosts, servers, or other devices 230 in the network. In contrast, the passive vulnerability scanner 270 may generally observe (or "sniff") various packets in the packet stream 280 traversing the network to passively scan the network. In particular, the passive vulnerability scanner 270 may reconstruct one or more sessions in the network from information contained in the packets sniffed in the packet stream 280, wherein the reconstructed network sessions may then be used to build a model or topology describing the network (e.g., any routers 240, hosts, servers, or other devices 230 actively running in the network, any services actively running on the routers 240, hosts, servers, or other devices 230, etc.). In one implementation, the passive vulnerability scanner 270 may further apply various signatures to the information observed in the packet stream 280 to identify vulnerabilities in the network and determine whether any packets in the packet stream 280 potentially target such vulnerabilities. In one implementation, the passive vulnerability scanner 270 may observe the packet stream 280 continuously, at periodic intervals, on a pre-configured schedule, or in response to determining that certain criteria or conditions have been satisfied. The passive vulnerability scanner 270 may then automatically reconstruct the network sessions, build or update the network model, identify the network vulnerabilities, and detect the traffic potentially targeting the network vulnerabilities in response to detecting any new or changed information in the network.

Figure 3:
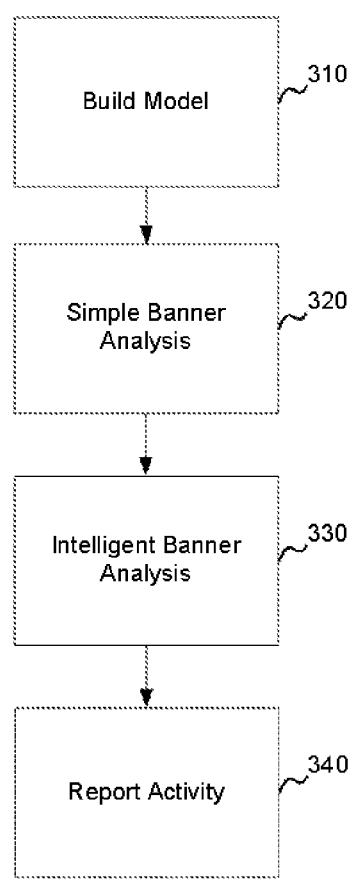
FIG. 3 illustrates a flowchart of an exemplary method for passively scanning a network with a passive vulnerability scanner that can identify encrypted and interactive sessions in the network, according to one aspect of the invention.

According to one aspect of the invention, FIG. 3 illustrates a flowchart of an exemplary method 300 for passively scanning a network with a passive vulnerability scanner that can identify encrypted and interactive sessions in the network. In particular, as noted above, the passive vulnerability scanner may perform the method 300 continuously, at periodic intervals, on a pre-configured schedule, or in response to determining that certain criteria or conditions have been satisfied. In one implementation, the method 300 shown in FIG. 3 may include an operation 310, wherein the passive vulnerability scanner may sniff various packets in a packet stream travelling across the network and build a model or topology of the network from information contained in the sniffed packets. In one implementation, the passive vulnerability scanner may build or update the network model in operation 310 continuously (i.e., anytime new or changed information has been discovered), at periodic intervals, at predetermined times, or in response to determining that certain criteria or conditions have been satisfied.

For example, in one implementation, the model or topology may be automatically updated to include any active devices that send or receive the packets in the packet stream (e.g., routers, hosts, servers, etc.), and further to include any active services running on the active devices that interact with the packets in the packet stream (i.e., operation 310 generally includes the passive vulnerability scanner observing traffic in the network and building the model to represent the devices active in the network and the services actively running on the active devices). For example, in response to observing a Transmission Control Protocol (TCP) SYN-ACK packet originating from port twenty-five on a particular device, the model may be updated in operation 310 in response to determining that the SYN-ACK packet represents new information to the model. Thus, from analyzing SYN and SYN-ACK packets in the packet stream, the passive vulnerability scanner may determine a status, identity, or other information describing active devices in the network.

In one implementation, the active devices that the passive vulnerability scanner discovers in the network may generally represent server devices and client devices. In particular, the active devices that provide services to other devices may represent the server devices (e.g., web servers, File Transfer Protocol servers, etc.), and the active devices that connect to the services provided on the server devices may represent the client devices. For example, in a context where a user machine connects to a particular web site (e.g., Google), the web site may generally include one or more server devices that provide services that can respond to requests received from the user machine, while the user machine, which typically does not provide any services within a local or remote network, may represent a client device. Thus, the server devices may generally provide the services on numbered ports, wherein each service available on the server devices may have a different port number, while the client devices may connect to particular services on the server devices using certain network addresses and port numbers. For example, a server device may provide a File Transfer Protocol (FTP) service on port twenty-one, while a client device may connect an Internet Protocol (IP) address for the server device on port twenty-one to access the FTP service.

In one implementation, the SYN and SYN-ACK packets described above may further provide information that can be used to identify operating systems running on the devices active in the network. For example, different operating systems (e.g., Linux, Windows XP, Solaris, etc.) tend to build SYN packets that can be uniquely distinguished from SYN packets originating from other operating systems, whereby the passive vulnerability scanner may analyze a structure for SYN packets originating from a certain device to determine an operating system running on the device. In one implementation, the passive vulnerability scanner may further analyze applications running on the devices to uniquely identify the operating systems running on the devices. For example, certain web browsers (e.g., Internet Explorer), email applications (e.g., Eudora), and other applications typically include information describing an underlying operating system (e.g., Windows XP) directly into various protocols, and the passive vulnerability scanner may detect such information from the traffic observed in the packet stream to identify the underlying operating system associated with the traffic. Alternatively (or additionally), an active vulnerability scanner may directly interrogate the device to identify the operating system running on the device.

In one implementation, in response to recognizing the active devices in the network and the operating systems, applications, and other services running on the active devices, an operation 320 may include the passive vulnerability scanner searching and/or scanning the network model to identify vulnerabilities in the network. In particular, operation 320 may include the passive vulnerability scanner performing simple banner analysis to identify any known vulnerability signatures in the traffic previously observed to build the network model. For example, in one implementation, the passive vulnerability scanner may reference a table stored in memory that correlates various known vulnerabilities with particular service versions, or the passive vulnerability scanner may forward information describing the service versions to a correlation engine or another suitable system that can recognize known vulnerabilities for the service versions from the forwarded information. For example, in one implementation, the passive vulnerability scanner may reconstruct various network sessions from the previously observed traffic in the network (e.g., sessions that include conversations or other messages exchanged between various server devices and client devices). Thus, in response to reconstructing the network sessions, operation 320 may include the passive vulnerability scanner analyzing the traffic associated with the reconstructed network sessions to identify any evidence relevant to particular vulnerabilities in the server devices and the client devices that communicate in the network sessions. In particular, the passive vulnerability scanner may recognize the known vulnerability signatures using simple banner analysis to identify services and versions of services that have known vulnerabilities. For example, packets communicated over certain protocols (e.g., Hypertext Transfer Protocol (HTTP), Simple Mail Transport Protocol (SMTP), FTP, etc.) typically have unique strings with text that can be used to identify a service version associated with the packets, whereby the passive vulnerability scanner may perform the simple banner analysis to identify the communication protocols and service versions involved in the network sessions. Consequently, in response to determining the communication protocols and the service versions involved in the network sessions, the passive vulnerability scanner may further identify any known vulnerabilities associated therewith.

However, in one implementation, certain communication protocols may have more complexity, whereby the simple banner analysis performed in operation 320 may not suitably identify the communication protocols or the service versions involved in the network sessions. Rather, more complex communication protocols (e.g., Domain Name System protocols, Simple Network Management Protocol, etc.) may require additional processing and analysis to suitably identify the versions for the services used to communicate the packets or other messages involved in the network sessions. As such, in one implementation, an operation 330 may include the passive vulnerability scanner performing intelligent banner analysis to handle any network sessions that involve more complex communication protocols. In particular, the passive vulnerability scanner may employ a signature language that defines various techniques for creating regular expression macros that can represent information communicated over more complex protocols. For example, the regular expression macros may include one or more text lines to represent patterns that the information communicated over the complex protocols typically include (e.g., knowledge obtained from monitoring communications over the complex protocols may be used to effectively write signatures for such protocols). As such, the passive vulnerability scanner may match signatures from packets communicated over complex protocols to the regular expression macros to identify service versions associated with such packets and correlate the signatures and service versions with known vulnerabilities.

Thus, the passive vulnerability scanner may generally recognize vulnerabilities in the network through a combination simple and intelligent banner analysis that can be used to identify signatures in the network traffic that match certain predetermined patterns. In particular, the passive vulnerability scanner may initially identify the signatures using simple banner analysis in operation 320, and then proceed to intelligent banner analysis in operation 330 to handle increasingly complex signatures. For example, in one implementation, operation 320 may include the passive vulnerability scanner identifying a web service running on a particular port at a particular network address (e.g., "Web service running at 10.20.30.40 on port 80"). In addition, operation 330 may then include the passive vulnerability scanner identifying a particular version of the web service (e.g., "Apache web server running at 10.20.30.40 on port 80") and a particular vulnerability for the version of the web service, whereby the vulnerability may then be reported in an operation 340 (e.g., the report may indicate that "The Apache web server running at 10.20.30.40 on port 80 has Apache version 2.1.3, which includes the following vulnerabilities . . . ").

In one implementation, as noted above, the passive vulnerability scanner may report the activity observed in the network and any vulnerabilities identified from the activity in operation 340. In one implementation, the passive vulnerability scanner may be configured to generate or communicate the report in response to observing a number of network sessions that meets or exceeds a predetermined threshold. Furthermore, in one implementation, the passive vulnerability scanner may be configured to require a minimum number of network sessions involving particular ports prior to identifying the port as active in the network. In one implementation, the minimum number of network sessions that must be observed prior to reporting a new active port may provide a level of sensitivity that can prevent the passive vulnerability scanner from reporting false positives and/or false negatives (e.g., a higher minimum number of sessions may cause the passive vulnerability scanner to only report services that have a large numbers of sessions, while a lower minimum number may cause the passive vulnerability scanner to report every observed network session).

For example, FTP applications, peer-to-peer file sharing application, instant message applications, and other similar applications often temporarily open ports on connections that may not be well known. Thus, the passive vulnerability scanner may observe the connection on the unknown port that has been temporarily opened and identify a new server on the port. Thus, requiring the minimum number of sessions for certain ports may enable the passive vulnerability scanner to avoid detecting temporary servers or services. In particular, because FTP, peer-to-peer, and instant message applications seldom establish communication channels on unknown ports in comparison to web servers that can establish many connections per second, the minimum number of network sessions may eliminate false positives that report temporary servers or services. Nonetheless, the passive vulnerability scanner may be configured to monitor and report any activity in the network, including temporary activity, in which case the minimum number of network sessions may be one or another low number.

In one implementation, as noted above, the activity and vulnerabilities reported in operation 340 may include one or more sessions in the network having interactive or encrypted characteristics, and may further include one or more devices and/or services that participate in the network sessions having interactive or encrypted characteristics. In particular, to identify the network sessions that have interactive characteristics, the passive vulnerability scanner may observe traffic in the network to identify data received from a user typing at a keyboard (e.g., data received from Telnet sources, Internet Relay Chat or other chat sources, Secure Shell sources, or other sources that permit keyboard inputs often employed in network attacks). Furthermore, to identify the network sessions that have encrypted characteristics, the passive vulnerability scanner may observe the traffic in the network to identify data having sufficient randomness to satisfy certain encryption criteria (e.g., compressed files may be naturally occurring random data sources, or randomness may be measured for packets communicated in certain network sessions, etc.). Thus, the activity and vulnerabilities that the passive vulnerability scanner reports in operation 340 may identify any servers, hosts, or other devices that represent sources and/or destinations participating in the interactive or encrypted network sessions, which may then be used to identify policy violations, potential vulnerabilities, network changes, or other information relevant to managing the network (e.g., a network session that creates an encrypted tunnel for running peer-to-peer, instant messaging, or similar applications may be reported because encrypted tunnels typically encrypt DNS requests associated with such applications, a feature which malicious users may exploit to bypass network policies, firewalls, or other security and compliance guidelines).

Figure 4:
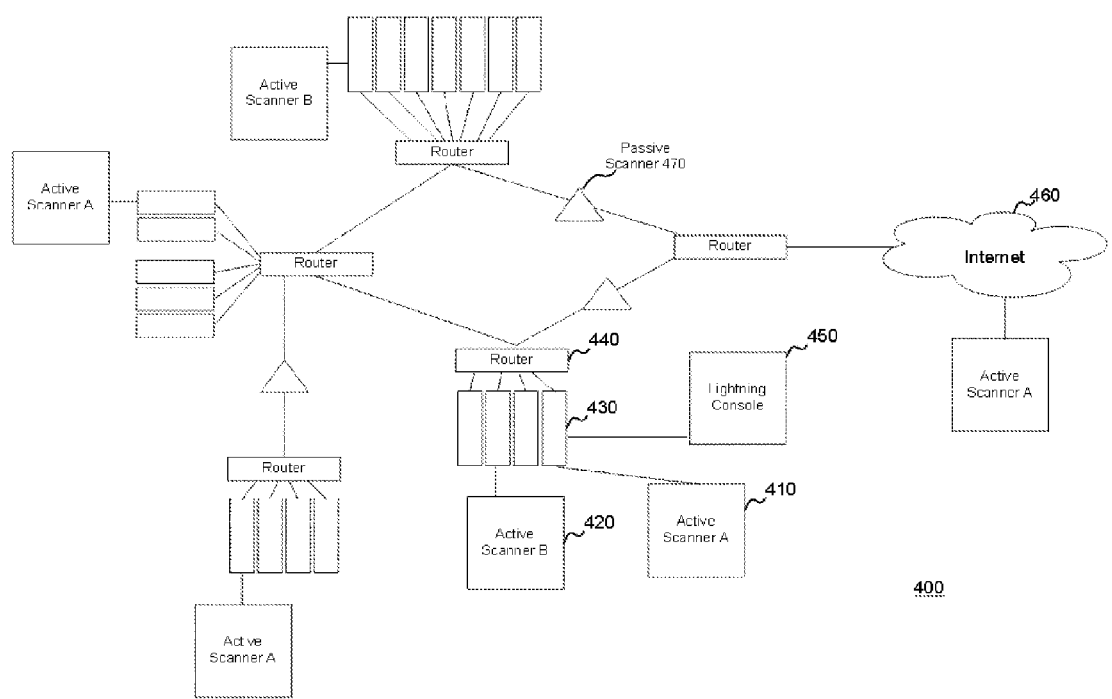
FIG. 4 illustrates another schematic diagram of the system for passively identifying encrypted and interactive network sessions, according to one aspect of the invention.

According to one aspect of the invention, FIG. 4 illustrates another schematic diagram of the system 400 for passively identifying encrypted and interactive network sessions. In particular, the system 400 shown in FIG. 4 may include a passive vulnerability scanner 470 that can passively observe traffic in a network to build a model or topology of the network, identify vulnerabilities in the network, and detect activity that may potentially target the vulnerabilities. In addition, the system 400 may further include one or more active vulnerability scanners (e.g., active vulnerability scanner 410, active vulnerability scanner 420, etc.), which may interrogate devices in the network to further build the model or topology of the network and identify further vulnerabilities in the network. Thus, the information obtained from the passive vulnerability scanner 470 and the active vulnerability scanners 410 and 420 may be combined to comprehensively model the network and the vulnerabilities in the network, whereby the passive vulnerability scanner may then passively observe traffic in the network to detect activity potentially targeting the vulnerabilities.

In one implementation, the active vulnerability scanners 410 and 420 and the passive vulnerability scanner 470 may be distributed across the network to reduce stress on the network. For example, in one implementation, the active vulnerability scanners 410 and 420 may scan limited portions of the network in parallel, whereby an amount of time to perform the active vulnerability scans may be reduced (i.e., because any particular active vulnerability scanner 410 or 420 can be distributed closer in distance to scanning targets 430, and because any particular active vulnerability scanner 410 or 420 only scans a certain portion of the network rather than the entire network). Furthermore, in one implementation, the passive vulnerability scanner 470 may supplement the information that the active vulnerability scanners 410 and 420 obtain from actively scanning the network (e.g., to obtain information that the active vulnerability scanners 410 and 420 may be unable to access).

For example, the passive vulnerability scanner 470 may depend on traffic that can be observed in the network to detect network devices or identify vulnerabilities in the network. As such, because the passive vulnerability scanner 470 can only detect devices or vulnerabilities from communications observed in the network, the active vulnerability scanners 410 and 420 may interrogate any device in the network to obtain information from inactive or non-communicative devices, whereby the active vulnerability scanners 410 and 420 and the passive vulnerability scanner 470 may provide a more comprehensive vulnerability analysis. Similarly, the active vulnerability scanners 410 and 420 may require substantial resources and/or time to complete active scans in the network, whereby active scanning results may become stale between the active scans. Thus, the passive vulnerability scanner 470 may continuously observe traffic on the network between the active scans to supplement the information obtained in the active scans without further stressing the network. In one implementation, the active scanning results obtained by the active vulnerability scanners 410 and 420 and the passive vulnerability scanner 470 may then be forwarded to a log correlation engine 450 (referred to as "Lightning Console" in FIG. 4), which may analyze the information received from the active vulnerability scanners 410 and 420, the passive vulnerability scanner 470, and various other devices 430 in the network to audit vulnerabilities and activity in the network.

In one implementation, the log correlation engine 450 may employ various techniques to provide a comprehensive vulnerability analysis system, as described in further detail in co-pending U.S. patent application Ser. No. 10/863,238, the contents of which are incorporated by reference above. In particular, the information obtained from the passive vulnerability scanner 470 and the active vulnerability scanners 410 and 420 may be forwarded to the log correlation engine 450, which may then aggregate the information to obtain active scanning information and passive scanning information that collectively encompasses the entire network. As such, the log correlation engine 450 may generally organize, distribute, manage, and report information relating to activity detected and remediated during network security audits to various entities across various organizations. For example, the log correlation engine 450 may aggregate information from the passive vulnerability scanner 470, the active vulnerability scanners 410 and 420, or other information sources, wherein the log correlation engine 450 may then analyze the information to identify vulnerabilities in the network, correlate events and other activity in the network with the vulnerabilities, and otherwise manage the network.

Figure 5:
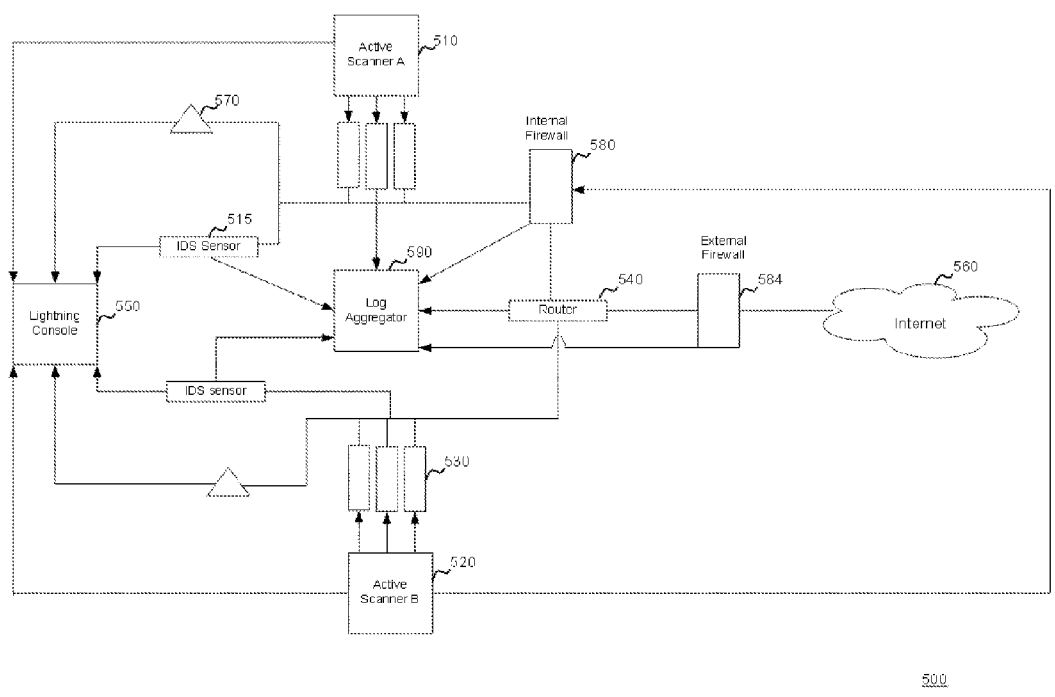
FIG. 5 illustrates another schematic diagram of the system for passively identifying encrypted and interactive network sessions, according to one aspect of the invention.

According to one aspect of the invention, FIG. 5 illustrates another schematic diagram of the system 500 for passively identifying encrypted and interactive network sessions. In particular, the system 500 shown in FIG. 5 may provide distributed network security, wherein a passive vulnerability scanner 570 and a plurality of active vulnerability scanners 510 and 520 may be integrated with a log correlation engine 550 (referred to as "Lightning Console" 550 in FIG. 5) and a log aggregator 590 to manage security and vulnerability information across a network. In one implementation, the passive vulnerability scanner 570 may generate one or more alerts in response to detecting new or changed information in the network from traffic observed in the network between active scans that the active vulnerability scanners 510 and 520 perform in the network. For example, the passive vulnerability scanner 570 may generate an alert in response to discovering a new vulnerability in the network from traffic observed in the network traffic and then forward the alert to the log correlation engine 550. In particular, the passive vulnerability scanner 570 may maintain a model describing active devices, services, and vulnerabilities in the network from traffic that actually travels across the network, whereby the passive vulnerability scanner 570 may continuously record information describing devices, services, and vulnerabilities associated with such traffic. As such, the passive vulnerability scanner 570 may detect the new or changed information in the network from comparing traffic describing devices, services, and vulnerabilities currently active in the network to the model that describes devices, services, and vulnerabilities active in the network at a previous time.

For example, in response to launching the passive vulnerability scanner 570, the passive vulnerability scanner 570 may observe traffic that describes a newly discovered router 540, internal firewall 580, external firewall 584, IDS sensor 515, remote hosts in a remote network 560 (e.g., the Internet), or other devices that communicate with the network. Further, the passive vulnerability scanner 570 may identify network addresses for the newly discovered devices, wherein the passive vulnerability scanner 570 may forward alerts describing the newly discovered devices and the network addresses associated therewith to the log correlation engine 550. Similarly, in response to the active vulnerability scanners 510 and 520 detecting new or changed information, the active vulnerability scanners 510 and 520 may generate a suitable alert and forward the same to the log correlation engine 550. In one implementation, the log correlation engine 550, which may generally manage the network model from the information obtained from the passive vulnerability scanner 570 and the active vulnerability scanners 510 and 520, may then compare the alerts forwarded from the passive vulnerability scanner 570 to a master database that describes the devices, services, and vulnerabilities in the network model. As such, the log correlation engine 550 may analyze the alerts forwarded from the passive vulnerability scanner 570 and suitably update the master database in response to determining that the alerts indeed describe new or changed information. However, in response to the log correlation engine 550 recognizing the network address and/or the newly discovered device, the log correlation engine 550 may determine that the alert represents a false positive rather than a new host, in which case the log correlation engine 550 may discard the alert without updating the master database.

In one implementation, as noted above, the active vulnerability scanners 410 and 420 and the passive vulnerability scanner 470 may be distributed across the network to reduce stress on the network. For example, in one implementation, the active vulnerability scanners 510 and 520 may be deployed inside the internal firewall 584 to actively scan devices in the network located therein (e.g., active vulnerability scanner 510), between the internal firewall 580 and the external firewall 584 to actively scan devices in the network located therein (e.g., active vulnerability scanner 520), outside the external firewall 584 to actively scan devices in the network located therein and/or in the remote network 560 (e.g., between an interface from the external firewall 584 to the remote network 560), or any suitable combination thereof. Similarly, the passive vulnerability scanner 570 may be deployed inside the internal firewall 584 to observe traffic travelling within the network (e.g., passive vulnerability scanner 570), between the internal firewall 580 and the external firewall 584 to observe incoming and outgoing traffic in the network (e.g., between the router 540 and the external firewall 584), outside the external firewall 584 to observe traffic originating from or travelling to the remote network 560 (e.g., between an interface from the external firewall 584 to the remote network 560), or any suitable combination thereof.

As such, in one implementation, deploying the passive vulnerability scanner 570 and the active vulnerability scanners 510 and 520 at different locations in the network may provide the log correlation engine 550 with passive and active scanning information that can be used to comprehensively model the devices, services, and vulnerabilities in the network. In particular, in response to the passive vulnerability scanner 570 and the active vulnerability scanners 510 and 520 actively or passively scanning the network, one or more alerts may be forwarded to the log correlation engine 550 in response to the passive vulnerability scanner 570 and the active vulnerability scanners 510 and 520 may detecting any new or changed information within an area of the network that the passive vulnerability scanner 570 and the active vulnerability scanners 510 and 520 may be responsible for scanning. Thus, the log correlation engine 550 may aggregate the information forwarded from the passive vulnerability scanner 570 and the active vulnerability scanners 510 and 520 with any further information that the log aggregator 590 receives from devices in the network (e.g., firewall logs, authentication logs, etc.). The log correlation engine 550 may then analyze the aggregated information to build a comprehensive model of the devices, services, and vulnerabilities in the network.

Figure 6:
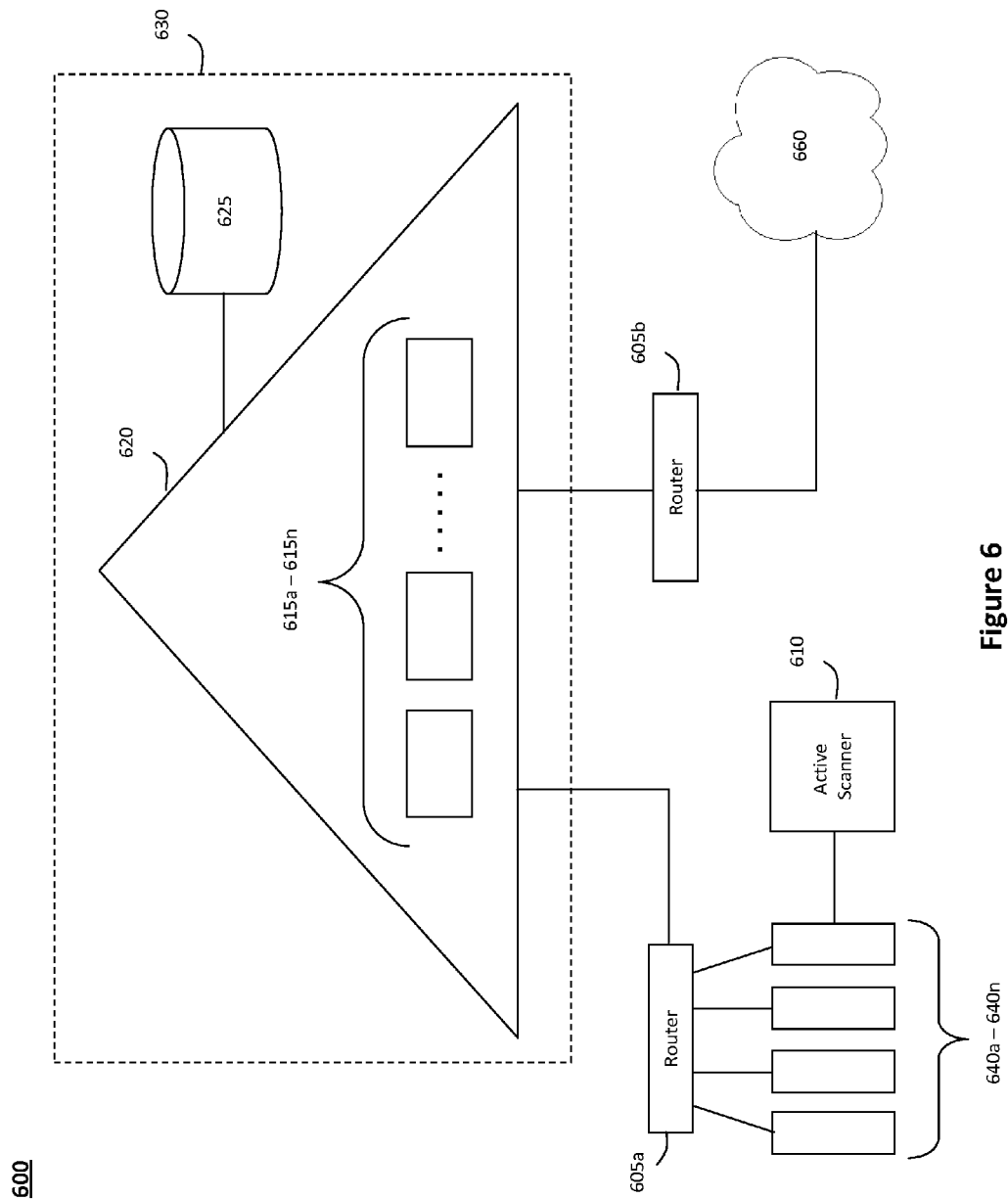
FIG. 6 illustrates another schematic diagram of the system for passively identifying encrypted and interactive network sessions, according to one aspect of the invention.

According to one aspect of the invention, FIG. 6 illustrates another schematic diagram of a network environment 600 that includes a system 630 for passively identifying encrypted and interactive network sessions. In particular, the network environment 630 shown in FIG. 6 may generally include one or more hosts or other hardware devices 640, one or more routers 605, an active vulnerability scanner 610, a passive vulnerability scanner 620, and an interface to a remote network 660. Further, in one implementation, the network environment 600 may generally provide substantially similar functionality to the functionality described above in connection with FIGS. 2 through 5, while the passive vulnerability scanner 620 may include various plug-ins 615 that the passive vulnerability scanners 620 may execute to passively identify one or more sessions in the network environment 630 having interactive or encrypted characteristics, including one or more of the devices 640 in the network environment 630 that represent sources and/or destinations in the sessions having the interactive or encrypted characteristics. In one implementation, the plug-ins may generally include any suitable computer program modules, software, or other computer-executable instructions that the passive vulnerability scanner 620 can execute to detect interactive or encrypted characteristics in the traffic observed in the network. For example, in one implementation, the plug-ins 615 may reference one or more rules 625 that define certain values or other measurable qualities that typically indicate whether network traffic has the encrypted or interactive characteristics (e.g., the rules 625 may define the characteristics for encrypted sessions based on factors described in "Basic Cryptanalysis: Field Manual 34-40-2" by the United States Army Training and Doctrine Command, while the characteristics for interactive sessions may be derived from factors described in "Detecting Backdoors" by Yin Zhang and Vern Paxson, each of which are hereby incorporated by reference in their entirety).

In particular, one or more of the plug-ins 615 may analyze the traffic in real-time and recognize any packets in the traffic that have sizes, frequencies, timing characteristics, directionalities, content, or other characteristics that the rules 625 define to indicate that certain packets likely include interactive data. In one implementation, the passive vulnerability scanner 620 may recognize interactive characteristics in any particular network session in response to detecting that packets communicated during the session have length characteristics indicating that the packets were sent from a user typing at a keyboard (e.g., Telnet data, chat data, SSH data, etc.). For example, keyboard packets typically have small payloads because many keyboard commands are relatively short, whereby the rules 625 may provide that packets having less than a predetermined number of bytes likely include interactive data (e.g., twenty bytes), and the rules 625 may further provide that interactive sessions include sessions that communicate a minimum ratio of packets having less than the predetermined number of bytes (e.g., twenty percent or more). Furthermore, because packets communicated in machine-driven, non-interactive traffic typically have small inter-packet arrival times, the rules 625 may further provide that the interactive sessions have a minimum ratio of packets with inter-packet arrival times in a certain range (e.g., twenty percent of the packets have inter-packet arrival times between ten and two-thousand milliseconds). In another example, because client devices typically initiate inbound interactive sessions, the rules 625 may instruct the passive vulnerability scanner 620 to analyze inbound traffic originating from remote hosts that initiated sessions with the network environment 630 for the interactive characteristics.

Furthermore, in one implementation, one or more of the rules 625 may cause the plug-ins 615 to recognize packets that have encrypted characteristics in response to the packets having sufficient randomness or other qualities (e.g., a remote host running a virtual private network client may create an encrypted session that can route traffic to and/or from untrusted networks). For example, one or more of the plug-ins 615 may analyze the traffic in real-time and recognize any packets in the traffic that communicate packets including characters appearing with certain frequencies that indicate that the packets likely include encrypted data. In particular, certain systems and spoken languages may have established norms for character frequencies, segment repetitions, or other statistical patterns, whereby the rules 625 may provide that packets having individual characters that appear with frequencies that deviate from the established norms likely include encrypted data (e.g., where characters such as "r," "s," "t," etc. that typically appear with disproportionately higher relative frequencies appear with more equal frequencies relative to less often used characters such as "q," "x," "z," etc.). Similarly, the rules 625 may further provide that encrypted sessions repeat certain character segments with frequencies that deviate from the established norms or otherwise communicate characters that have statistical patterns deviating from the established norms. For example, in one implementation, the rules 625 may derive an "index of coincidence" based on statistical or probabilistic theories to indicate whether any particular network session likely communicates encrypted data, wherein the index of coincidence may express a ratio of coincidences observed in the session to a number of coincidences that would be expected in a random distribution (e.g., as described in Chapter 2 of "Basic Cryptanalysis: Field Manual 34-40-2" by the United States Army Training and Doctrine Command, which is incorporated by reference above).

In one implementation, to avoid reporting false positives, one or more of the plug-ins 615 may discard activity associated with known interactive and/or encrypted services (e.g., activity on ports with well-known interactive services, such as port twenty-three for Telnet, may be discarded). Furthermore, to avoid reporting duplicate interactive and encrypted sessions, one or more of the plug-ins 615 may maintain a state for the reported interactive and encrypted sessions (e.g., the passive vulnerability scanner 620 may only report one encrypted session for an electronic commerce server 640 having a large number of Secure Socket Layer connections on port number 443). As such, in one implementation, passively detecting the interactive and encrypted characteristics associated with the sessions observed in the traffic travelling across the network may be used to identify changes to the network, identify potential vulnerabilities in the network, detect activity that targets the potential vulnerabilities, or otherwise provide information for managing the network. In particular, many backdoor and rootkit applications communicate with non-standard ports and custom protocols to obscure network sessions that include malicious interactive and/or encrypted activity. For example, many network attacks employ rootkit applications that typically replace critical system executables with malicious data, which then hides the rootkit and any other applications, files, or other data installed during the attacks. Thus, many network attacks may employ rootkit applications to seize control over operating systems, override existing login mechanisms with backdoor login processes, install malicious drivers or kernel modules, or perform other malicious activity that can be concealed from the passive vulnerability scanner 620. Thus, the passive vulnerability scanner 620 may identify interactive and/or encrypted characteristics in the traffic observed in the network to identify Telnet, chat, SSH, and other interactive sessions that include remote keyboard inputs, and further to identify sessions that send or receive compressed files, SSL messages, encrypted emails, or other encrypted or randomized data that may be suspicious or otherwise associated with a potential attack on the network. As a result, the passive vulnerability scanner 620 may detect potential vulnerabilities and malicious activity that occur during interactive or encrypted sessions that could otherwise remain undetected.

In one implementation, the passive vulnerability scanner 620 may observe the traffic in the network in real-time to detect whether the traffic includes packets having sizes, frequencies, or other qualities associated with interactive sessions, and further to detect whether the traffic includes packets having sufficient randomization or other qualities associated with encrypted sessions. For example, in addition to analyzing the size, frequency, and randomization associated with the packets, the passive vulnerability scanner 620 may observe the traffic to detect certain services or applications typically involved in interactive or encrypted sessions (e.g., the passive vulnerability scanner 620 may automatically associate packets that interact with Telnet, chat, or SSH services with interactive sessions, and may further automatically associate packets that communicate data over encrypted tunnels or on encrypted ports with encrypted sessions). In one implementation, to detect the interactive or encrypted sessions, the passive vulnerability scanner 620 may execute one or more of the plug-ins 615a, which can detect various applications and services typically used during interactive or encrypted network sessions (e.g., using simple and/or intelligent banner analysis). For example, in one implementation, the plug-ins 615a may observe inter-packet arrival times or other timing characteristics associated with packets communicated during any particular network session and detect that the session includes interactive activity in response to determining that the inter-packet arrival times or other timing characteristics likely reflect characteristics associated with a human typing on a keyboard (e.g., the rules 625 may indicate that a particular session including many small packets relative to a total number of packets in the session likely represents an interactive session if the small packets have inter-packet arrival times or other timing characteristics that match typical human keystroke frequencies).

As such, in one implementation, the plug-ins 615 may be executed to detect internal interactive sessions between different hosts 640 within the network, outbound interactive sessions originating within the network and destined for the remote network 660, and inbound interactive sessions originating from the remote network 660 and destined for the network. Thus, the passive vulnerability scanner 620 may identify any interactive activity that includes data sent from a human typing on a keyboard, which may be indexed according to whether the interactivity activity occurs in an internal, outbound, or inbound context. Furthermore, because the interactive activity that the passive vulnerability scanner 620 detects may relate to legitimate or illegitimate traffic, the passive vulnerability scanner 620 may be configured to determine whether any of the interactive activity describes duplicative activity or false positives. For example, in response to identifying activity that occurs during an interactive session, the passive vulnerability scanner 620 may create or update a state associated with the activity (e.g., the passive vulnerability scanner 620 may create one report to describe one particular Telnet session even though the session may include a large number of packets that include Telnet data). Furthermore, the passive vulnerability scanner 620 may be configured to discard any activity originating from or destined to certain ports with well known interactive services (e.g., Telnet port number twenty-three), flag packets communicating small amounts of data during periods when performance in the network suffers from reduced bandwidth, or otherwise indicate whether certain interactive activity may be a false positive.

In one implementation, in response to identifying any particular interactive service or session, the passive vulnerability scanner 620 may report the interactive service or session for further analysis. For example, the passive vulnerability scanner 620 may report summaries for various different ports that sent data or received data during an internal, inbound, or outbound interactive session, wherein the various port summaries may be analyzed to identify certain services or ports typically employed during interactive sessions (e.g., the log correlation engine may aggregate and analyze the various port summaries reported from the passive vulnerability scanner 620, whereby the log correlation engine may discover that every router 605 in the network had a Telnet service placed on a high port). Thus, the passive vulnerability scanner 620, the log correlation engine, or other suitable components in the network security system 620 may identify certain ports, services, or other information typically used during interactive sessions. Furthermore, the information relating to the interactive sessions may be integrated with active scanning results obtained from the active vulnerability scanner 610, other passive scanning results obtained from the passive vulnerability scanner 620, event logs generated across the network, or any other information that may be relevant to further understanding the interactive sessions. For example, in response to detecting that an interactive port has been opened on a particular system in the network, the particular underlying system may be taken into account to determine whether or not opening the interactive port causes or targets a potential vulnerability (e.g., a router 605 likely would not participate in peer-to-peer file sharing or Voice Over IP applications, whereas desktop hosts 640 would, whereby whether opening the interactive port causes or targets a potential vulnerability may depend on the system having the opened interactive port a type of application that communicates on the opened port).

Furthermore, in one implementation, the plug-ins 615 may be executed to detect internal encrypted sessions between different hosts 640 within the network, outbound encrypted sessions originating within the network and destined for the remote network 660, and inbound encrypted sessions originating from the remote network 660 and destined for the network. Thus, the passive vulnerability scanner 620 may identify any encrypted activity that communicates data having sufficient randomization or a predetermined file type (e.g., .zip, .gz, etc.), or that communicates with certain services or applications that typically employ encryption (e.g., SSH, HTTPS, VPN, etc.). In one implementation, the encrypted activity may then be indexed according to whether the encrypted activity occurs in an internal, outbound, or inbound context. Furthermore, because the encrypted activity that the passive vulnerability scanner 620 detects may relate to legitimate or illegitimate traffic, the passive vulnerability scanner 620 may be configured to determine whether any of the encrypted activity describes duplicative activity or false positives (e.g., in a similar manner as described above with reference to interactive sessions). For example, many email applications provide encryption services to provide secure email access, whereby the passive vulnerability scanner 620 may filter encrypted sessions reported from Simple Mail Transfer Protocol (SMTP) hosts 640 (e.g., the passive vulnerability scanner 620 may only report messages encrypted with Pretty Good Privacy (PGP) or GNU Privacy Guard (GPG), which have vulnerabilities that can be exploited to execute shell commands with server process permissions).

In one implementation, in response to identifying any particular encrypted service or session, the passive vulnerability scanner 620 may report the encrypted service or session for further analysis. For example, the passive vulnerability scanner 620 may report summaries for various different ports that sent data or received data during an internal, inbound, or outbound encrypted session, wherein the various port summaries may be analyzed to identify certain services or ports typically employed during the encrypted sessions (e.g., in a similar manner as described above with reference to interactive sessions). As such, in one implementation, the information reported for the interactive and encrypted sessions may be analyzed to detect any potential vulnerabilities in the network, and further to configure the active vulnerability scanner 610 and/or the passive vulnerability scanner 620 to subsequently monitor the network for any activity potentially targeting such vulnerabilities. For example, the various port summaries that report the interactive and encrypted sessions may be analyzed to identify certain network addresses (e.g., MAC addresses, IP addresses, etc.) participating in the interactive and encrypted sessions, and further to identify assets (e.g., routers 605, hosts 640, etc.) participating in the interactive and encrypted sessions. Thus, the various port summaries reporting the interactive and encrypted sessions may provide further insight relating to activity performed by the services employed during the interactive and encrypted sessions, which may be used to detect changes to the network, remediate vulnerabilities in the network, and otherwise manage the network (e.g., hosts 640 that participate in the interactive and encrypted sessions may be cross-referenced with dynamic asset lists describing hosts 640 that have likely been compromised to correlate the interactive and encrypted sessions with vulnerabilities associated with the compromised hosts 640).

Figure 7:
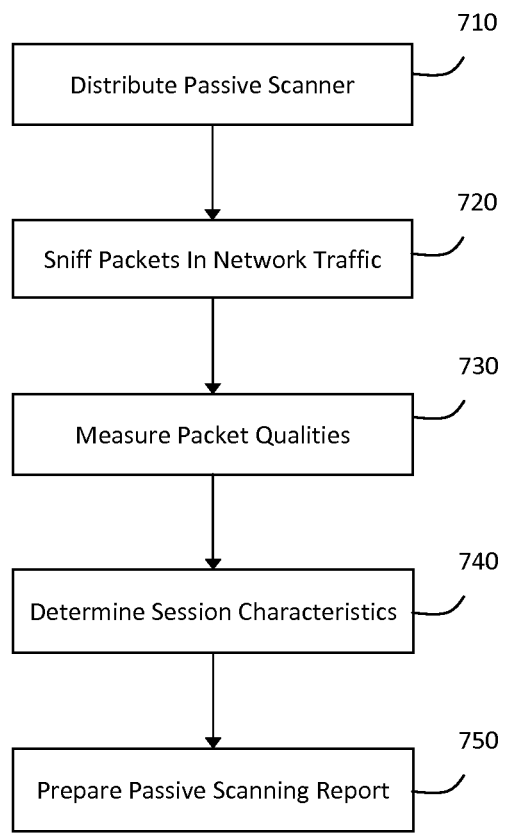
FIG. 7 illustrates an exemplary method for passively identifying encrypted and interactive network sessions, according to one aspect of the invention.

According to one aspect of the invention, FIG. 7 illustrates an exemplary method 700 for passively identifying encrypted and interactive network sessions. In particular, the method 700 shown in FIG. 7 may generally provide substantially similar functionality to the functionality described above in connection with FIG. 6 (e.g., the method 700 may generally provide functionality for identifying and analyzing activity that occurs during interactive and encrypted sessions). For example, in one implementation, an operation 710 may include distributing a passive vulnerability scanner that can identify one or more sessions in a network having interactive or encrypted characteristics. Furthermore, as noted above, the passive vulnerability scanner may be distributed at any suitable location that provides optimal visibility into the network and activity occurring in the network (e.g., on a network hub, a spanned switch port, a network tap, a network choke point, a dial up node, a server farm, behind a firewall, etc.).

In one implementation, in response to distributing the passive vulnerability scanner on the network, the passive vulnerability scanner may then sniff various packets in traffic travelling across the network in an operation 720. In particular, operation 720 may include the passive vulnerability scanner sniffing the traffic in the network to determine whether the packets have interactive or encrypted characteristics. For example, an operation 730 may include the passive vulnerability scanner measuring certain qualities associated with the packets, including sizes, frequencies, inter-packet arrival times, randomization, or other qualities that indicate whether the packets include interactive or encrypted data. Thus, based on the sizes, frequencies, inter-packet arrival times, randomization, or other qualities measured for the packets in operation 730, the passive vulnerability scanner may determine whether the packets have interactive or encrypted characteristics in an operation 740. For example, the passive vulnerability scanner may determine that the packets have characteristics associated with an interactive session in response to detecting that the packets interact with Telnet services, chat services, SSH services, or otherwise have qualities associated with a human typing on a keyboard. Further, the passive vulnerability scanner may determine that the packets have characteristics associated with an encrypted session in response to detecting sufficient randomization, VPN communications, or other qualities typically associated with encrypted sessions.

In one implementation, in response to identifying any particular interactive or encrypted session, an operation 750 may include the passive vulnerability scanner preparing a report that describes the interactive and encrypted sessions. For example, the report may include various summaries for different ports that sent data or received data during internal, inbound, or outbound interactive or encrypted sessions, wherein the various port summaries may be analyzed to identify certain services or ports typically employed during the interactive or encrypted sessions. As such, the report describing the interactive and encrypted sessions may be analyzed to detect any potential vulnerabilities in the network, and further to configure an active vulnerability scanner and/or the passive vulnerability scanner to subsequently monitor the network for any activity potentially targeting such vulnerabilities. For example, the various port summaries in the report that describes the interactive and encrypted sessions may be analyzed to identify certain network addresses, hosts, services, or other assets in the network that participated in the interactive and encrypted sessions. Thus, the report prepared in operation 750 may provide further insight relating to activity performed during the interactive and encrypted sessions, which may be used to detect changes to the network, remediate vulnerabilities in the network, and otherwise manage the network.

In summary, the system and method described herein may generally include one or more active vulnerability scanners interrogating devices in the network to discover devices, services, and vulnerabilities in the network, and may further include one or more passive vulnerability scanners passively observing traffic in the network to supplement the information obtained from the active vulnerability scanners. Further, because discovering vulnerabilities in the network typically requires information describing encrypted and interactive sessions that may include activity creating or targeting potential vulnerabilities in the network, the system and method described herein may model ports, services, hosts, and other assets that participate in the encrypted and interactive sessions in the network. As such, the system and method described herein may employ a passive vulnerability scanner to detect and monitor encrypted and interactive network sessions, which may be integrated with information obtained from an active vulnerability scanner, a log correlation engine, or other components in a network vulnerability management system that can comprehensively manage potential vulnerabilities in the network.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A method for passively identifying encrypted and interactive network sessions, comprising:
    observing, by a passive vulnerability scanner, activity on a network, wherein the activity includes a plurality of packets that travel across the network during one or more sessions on the network;
    sniffing, by the passive vulnerability scanner, the plurality of packets that travel across the network during the one or more sessions on the network;
    determining, by the passive vulnerability scanner, whether the one or more sessions communicate interactive or encrypted data based on a comparison of one or more characteristics of at least a first packet and a second packet of the plurality of packets;
    reconstructing the one or more sessions in response to the passive vulnerability scanner determining that the one or more sessions communicate interactive or encrypted data, wherein reconstructing the one or more sessions includes identifying an originating host and a receiving host for the interactive or encrypted data;
    identifying, by the passive vulnerability scanner, one or more potential vulnerabilities associated with the one or more reconstructed sessions; and
    preparing, by the passive vulnerability scanner, a report describing the one or more reconstructed sessions and the one or more potential vulnerabilities;
    wherein the passive vulnerability scanner determines that the one or more sessions communicate encrypted data based on one or more similarities of one or more characteristics of at least the first packet and the second packet, wherein the one or more characteristics comprise: a randomization measure that satisfies a predetermined threshold, a compressed file type, or identification of a service that communicates encrypted data.

2. The method of claim 1, wherein reconstructing the one or more sessions further includes identifying a port or a service on the originating host that communicates the interactive or encrypted data between the originating host and the receiving host.

3. The method of claim 1, wherein reconstructing the one or more sessions further includes identifying a port or a service on the receiving host that communicates the interactive or encrypted data between the originating host and the receiving host.

4. The method of claim 1, wherein the passive vulnerability scanner determines that the one or more sessions communicate interactive data based on one or more similarities of one or more characteristics of at least the first packet and the second packet, wherein the one or more characteristics comprise: a size, frequency, inter-packet arrival time, or timing characteristic indicating that the one or more packets include data typed on a keyboard.

5. The method of claim 1, wherein the passive vulnerability scanner determines that the one or more sessions communicate interactive data based on one or more similarities of one or more characteristics of at least the first packet and the second packet, wherein the one or more characteristics comprise: identification of a Telnet service, identification of a chat service, identification of a Secure Shell service, or identification of another service that communicates data typed on a keyboard.

6. The method of claim 1, wherein the report indicates whether the one or more reconstructed sessions include internal sessions, outbound sessions, or inbound sessions.

7. The method of claim 6, wherein the report indicates that the reconstructed sessions include internal sessions in response to determining that the originating host and the receiving host have locations within the network.

8. The method of claim 6, wherein the report indicates that the reconstructed sessions include outbound sessions in response to determining that the originating host has a location within the network and that the receiving host has a location remote from the network.

9. The method of claim 6, wherein the report indicates that the reconstructed sessions include inbound sessions in response to determining that the originating host has a location remote from the network and that the receiving host has a location within the network.

10. The method of claim 1, wherein the report further describes one or more ports and one or more services that communicate the interactive or encrypted data between the originating host and the receiving host.

11. A system for passively identifying encrypted and interactive network sessions, comprising:
    a network that includes a plurality of hosts; and
    a passive vulnerability scanner that observes a plurality of packets travelling across the network during one or more sessions on the network, wherein the passive vulnerability scanner is configured to:
    sniff the plurality of packets that travel across the network during the one or more sessions on the network,
    determine whether the one or more sessions communicate interactive or encrypted data based on a comparison of one or more characteristics of at least a first packet and a second packet of the plurality of packets;
    reconstruct the one or more sessions in response to the passive vulnerability scanner determining that the one or more sessions communicate interactive or encrypted data, wherein the one or more reconstructed sessions identify an originating host and a receiving host for the interactive or encrypted data;
    identify one or more potential vulnerabilities associated with the one or more reconstructed sessions; and
    prepare a report describing the one or more reconstructed sessions and the one or more potential vulnerabilities, wherein the report further identifies one or more ports and one or more services that communicate the interactive or encrypted data between the originating host and the receiving host;
    wherein the passive vulnerability scanner determines that the one or more sessions communicate encrypted data based on one or more similarities of one or more characteristics of at least the first packet and the second packet, wherein the one or more characteristics comprise: a randomization measure that satisfies a predetermined threshold, a compressed file type, or identification of a service that communicates encrypted data.

12. The system of claim 11, wherein the one or more reconstructed sessions further identify a port or a service on the originating host that communicates the interactive or encrypted data between the originating host and the receiving host.

13. The system of claim 11, wherein the one or more reconstructed sessions further identify a port or a service on the receiving host that communicates the interactive or encrypted data between the originating host and the receiving host.

14. The system of claim 11, wherein the passive vulnerability scanner determines that the one or more sessions communicate interactive based on one or more similarities of one or more characteristics of at least the first packet and the second packet, wherein the one or more characteristics comprise: a size, frequency, inter-packet arrival time, or timing characteristic indicating that the one or more packets include data typed on a keyboard.

15. The system of claim 11, wherein the passive vulnerability scanner determines that the one or more sessions communicate interactive data based on one or more similarities of one or more characteristics of at least the first packet and the second packet, wherein the one or more characteristics comprise: identification of a Telnet service, identification of a chat service, identification of a Secure Shell service, or identification of another service that communicates data typed on a keyboard.

16. The system of claim 11, wherein the passive vulnerability scanner is further configured to determine that the reconstructed sessions include internal sessions in response to the originating host and the receiving host having locations within the network.

17. The system of claim 11, wherein the passive vulnerability scanner is further configured to determine that the reconstructed sessions include outbound sessions in response to the originating host having a location within the network and the receiving host having a location remote from the network.

18. The system of claim 11, wherein the passive vulnerability scanner is further configured to determine that the reconstructed sessions include inbound sessions in response to the originating host having a location remote from the network and the receiving host having a location within the network.

* * * * *